Dec. 19, 1944.  C. UNTERBERG  2,365,227
ENGINE OPERATION ANALYZER
Filed May 11, 1943
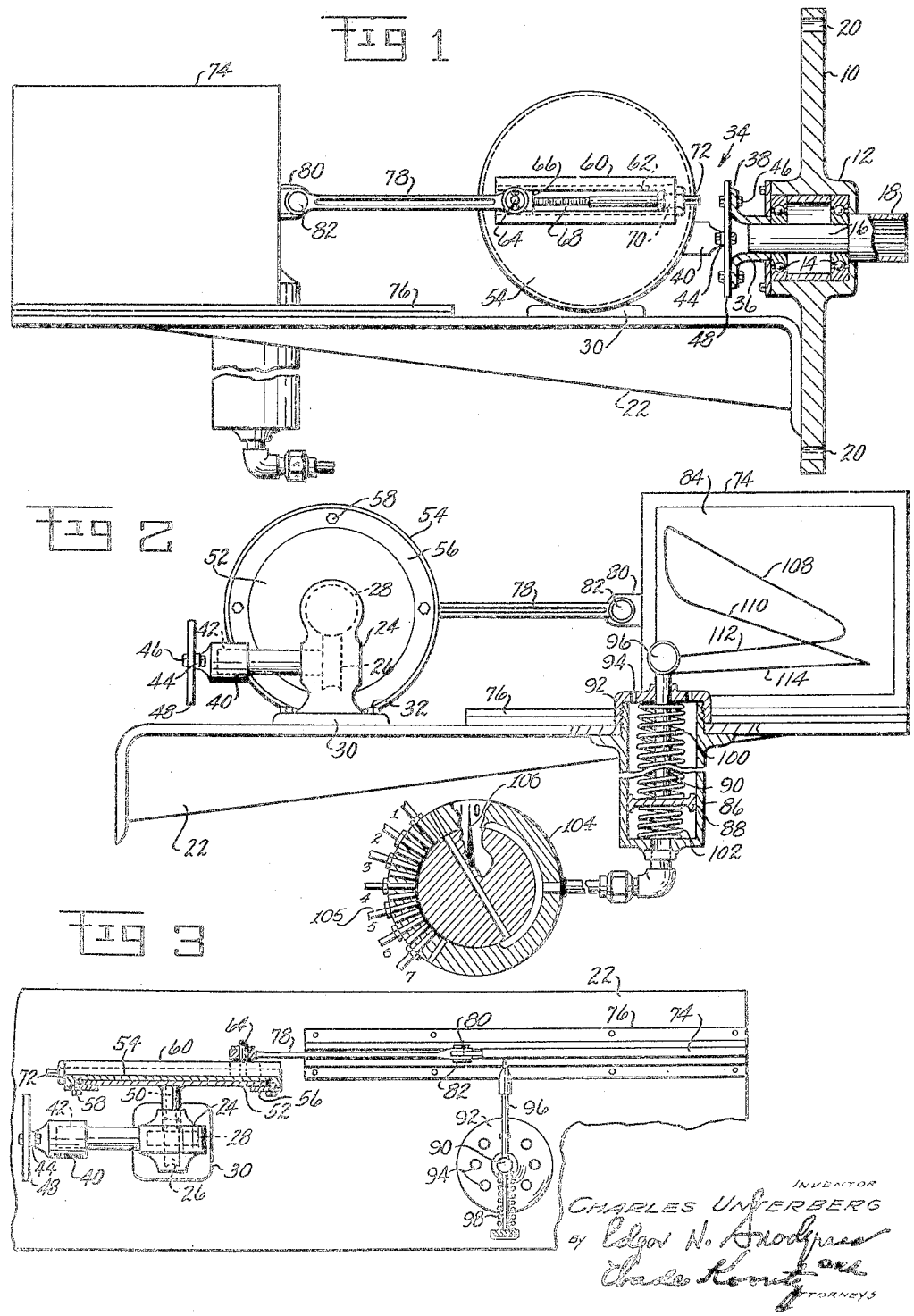

Patented Dec. 19, 1944

2,365,227

UNITED STATES PATENT OFFICE 2,365,227

ENGINE OPERATION ANALYZER

Charles Unterberg, Osborn, Ohio

Application May 11, 1943, Serial No. 486,601

1 Claim. (Cl. 234—21)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an engine operation analyzer, having special application to aircraft engines.

An object of the invention is to provide a device of this character which may be operatively connected to an aircraft engine with minimum expenditure of time and effort.

Another object is to provide, in a device of this kind, easily operated adjusting means for bringing the device into synchronism with the engine being analyzed.

Other objects and advantages will appear as the invention is further described, reference being had to the drawing, wherein:

Fig. 1 is a rear elevation of the analyzer, the mounting flange and the power shaft bearings being shown in axial section.

Fig. 2 is a front elevation, with the mounting flange and the power bearing structure omitted, the recording cylinder and the selector valve being shown in section.

Fig. 3 is a top plan view, also having the mounting flange and the power shaft and bearing structure omitted.

Referring more particularly to Fig. 1, a flanged bearing support 10 has a hub 12 which houses bearings 14 in which a shaft 16 is rotatable. The shaft 16 has an enlarged splined end 18 which is duplicative of the adapter on the end of the shaft of the electric starter of the engine being analyzed. The flanged bearing support 10 also is of the same contour and dimensions as the starter flange, the bolt holes 20 aligning with the tapped holes in the mounting pad on the engine, whereby the starter may be removed from an engine and the analyzer mounted in its place. The shaft 16, since it takes power to operate the analyzer from the engine may, for purposes of description, be referred to as the power shaft. A bracket 22 is fastened to the outer face of the bearing support 10 for supporting other parts of the mechanism. The support 10 and bracket 22 together constitute the framework of the analyzer.

Mounted on the bracket 22, a short way out from its support, is a gear box 24 (see Figs. 2 and 3) containing right angle drive gears 26 and 28. Gear box 24 has a base 30 which is fastened to the bracket 22 by screws 32. A coupling 34 drivably connects the shaft 16 to the gear 26, the coupling comprising a driving hub 36 fast on the shaft 16 and having two oppositely extending ears 38, and a driven hub 40, fast on the driving shaft 42 of the gear 26 and having two oppositely extending ears 44. Ears 38 and 44 are spaced ninety degrees and secured by bolts 46 to a flexible disc 48. A driven shaft 50 having rotative bearing in the box 24 drivably connects the gear 28 to a disc 52.

A second disc 54 is adjustably carried by the disc 52, the rear face of the disc 54 being recessed to rotatably receive the disc 52. A clamping ring 56 is held to the disc 54 by screws 58, the disc 52 being so fitted to the disc 54 that when the screws 58 are drawn up both discs must rotate as one, but, when the screws are loosened, relative rotation between the discs is possible. To facilitate description, the disc 52 may be referred to as the driving crank-disc and the disc 54 as the driven crank-disc.

An adjustable-throw crank is provided by fastening an adustable-throw-crank member 60 diametrically across the front face of the disc 54, a T slot 62 extending the full length of the member 60. A crank-pin 64 is carried in a T-shaped block 66 which is slidable in the T slot 62 of the member 60. A crank-throw-adjusting screw 68 has its threads fitted freely to a tapped hole extending lengthwise through the block 66 and end thrust means at 70 to prevent the screw 68 moving endwise with respect to the member 60. The screw 68 may be turned by its squared head 72 to thereby adjust the throw of the crank to some convenient fraction of the piston travel of the engine being analyzed.

A card holder 74 consists of a rectangular plate with a T-shaped lower edge which fits slidably in a T slot formed by two gibs 76 which are fastened to the bracket 22. A connecting rod 78 at the forward end is joined to the crank pin 64, and, at the rearward end, to an ear 80 on the plate 74 by a wrist pin 82. Obviously, rotation of the disc 54 will reciprocate the plate 74, and adjustment of the crank-throw may be made to bring the movement of the plate 74 into coincidence with the piston travel or some convenient fraction thereof. A card 84 may be secured to the holder 74 in any suitable manner.

As a means of recording pressure on the card 84, a cylinder 86 is secured to the bracket 22 and a piston 88 is slidably fitted for vertical movement in the cylinder. A piston rod 90 extends upwardly from the piston and has sliding bearing in the piston head 92. Holes 94 connect the space in the cylinder 86 which is above the piston 88 to the atmosphere.

A pencil holder 96, or other suitable writing point, is carried on the piston rod 90 at its upper end, the holder being slidable transversely through the rod and normally held with the pencil retracted from the card by a spring 98. Springs 100 and 102 above and below the piston are provided for dampening and restricting movement of the piston due to pressure variation in the cylinder of the engine under analysis. The lower end of the cylinder 86 is connected through a selector valve 104 and pipes 105 to any one of the seven cylinders of the engine, the valve being so constructed (see Fig. 2) that when the pointer 106 is at position intermediate the graduations provided for indicating the several cylinders, the lower end of the cylinder 86 will be connected to atmosphere, as shown. The upper spring 100 is calibrated in pounds per square inch, its maximum movement corresponding to the maximum pressure in the cylinder of the engine which is to be analyzed. The lower spring is calibrated for pressures below atmosphere, its maximum movement corresponding to the maximum negative pressure which will occur in the cylinder of the engine. The indicator card 84 may preferably be provided with a vertical graduation near its left hand edge, indicating the pressures impressed by the piston 88 on the springs 100 and 102. Different springs and different graduations may preferably be provided for analyzing engines of different capacities. The opposing forces of the two springs should be in equilibrium when the writing point is at zero on the indicator card.

The operation of the device is substantially as follows:

The engine starter is removed and the analyzer substituted and fastened to the engine by bolts extending through holes 20, the splined end 18 of the shaft 16 being meshed with the splines on the engine shaft by which the starter is normally driven. Te engine crankshaft may now be rotated to bring the piston of the cylinder to be tested to top center. With the engine piston so held on top center, the clamp screws 58 and clamp ring 56 are loosened and the disc 54 rotated on the disc 52 until they assume the relation shown in the several views of the drawing, whereupon the screws 58 are tightened. The crank pin 64 has thus been so positioned that the stroke of the card holder 74 is timed with the stroke of the engine piston which was placed on top center. The crank-throw-adjusting screw 72 is now turned until the throw of the crank pin 64 corresponds to the throw of the crank of the engine or to some convenient fraction thereof. Springs 100 and 102 of the proper calibration to correspond to the engine under test are placed in cylinder 86 and a card 84 attached to the holder 74. The pointed 106 is now placed next to, but not on, the number representing the cylinder to be tested.

The engine is now put into operation, and when operating under the condition at which it is desired to make the diagram, the pointer is moved to the number representing the cylinder to be tested, and the pencil holder 96 is pushed against the card 84 and kept there for one complete cycle of the engine. The diagram, seen in Fig. 2, shows the power stroke 108, the exhaust stroke 112, the suction stroke 114, and the compression stroke 110, substantially as in common practice, and calculations showing engine operation are made in the conventional manner.

When performance of any other of the same engine's cylinders is to be analyzed, adjustment of the plate 54 to the cylinder under consideration must be made in the same manner as above indicated. If an engine of different stroke is under analysis, the crank throw should be adjusted with the screw 72, as hereinbefore explained.

While the embodiment shown is particularly applicable to analyzing aircraft engines, slight modification will adapt the device to the analysis of any reciprocating engine. Other modifications of the device will come within the scope of the appended claim.

Having described the invention, I claim:

An engine operation analyzer for an engine having a cylinder comprising a framework including a support for attaching it to a part of the engine, an adjustable-throw crank rotatably supported on said framework, means drivably connecting said crank for rotation by said engine, means providing rotative adjustment of the crank with respect to said engine, a crank pin adjustable toward or away from the axis of said crank, a card holder reciprocally mounted on said framework, reciprocating means joining said crank pin to said card holder, a recording cylinder, closed at one end but open to the atmosphere at the other, fast on said framework with its axis at right angles to the reciprocating movement of said card holder, a piston slidable in said recording cylinder, the space between said piston and said closed end being connected to the engine cylinder under analysis, resilient means associated with said recording cylinder, opposing piston movement in either direction in said recording cylinder, calibrated to correspond to the maximum positive and negative pressures of the engine cylinder being analyzed, operating means associated with said piston, a writing point carried on said operating means, and means to engage said card holder with said writing point.

CHARLES UNTERBERG.